United States Patent
Gellner et al.

(10) Patent No.: US 12,485,751 B2
(45) Date of Patent: Dec. 2, 2025

(54) METHODS AND SYSTEMS FOR USING ROAD PREVIEW TO CONTROL VEHICLE VELOCITY DURING CORNERING

(71) Applicant: GM GLOBAL TECHNOLOGY OPERATIONS LLC, Detroit, MI (US)

(72) Inventors: Ryan Aaron Gellner, Livonia, MI (US); Tyler P. Morris, Madison Heights, MI (US); Brian K. Saylor, South Lyon, MI (US); Eric B. Hoyer, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 172 days.

(21) Appl. No.: 18/495,673

(22) Filed: Oct. 26, 2023

(65) Prior Publication Data
US 2025/0135882 A1    May 1, 2025

(51) Int. Cl.
*B60K 31/00* (2006.01)
*B60W 10/04* (2006.01)
(Continued)

(52) U.S. Cl.
CPC ......... *B60K 31/0075* (2013.01); *B60W 10/04* (2013.01); *B60W 30/143* (2013.01);
(Continued)

(58) Field of Classification Search
CPC ........ B60K 31/0075; B60W 30/18145; B60W 2420/403; B60W 2510/20; B60W 2520/10; B60W 2520/125; B60W 2530/20; B60W 2530/209; B60W 2552/30; B60W 2555/20; B60W 2556/40; B60W 2720/10; B60W 2510/205; B60W 30/143; B60W 2540/18;
(Continued)

(56) References Cited

U.S. PATENT DOCUMENTS

| 2015/0306957 A1* | 10/2015 | Sujan | B60W 40/076 701/94 |
| 2020/0377082 A1* | 12/2020 | Nassouri | B60W 30/0956 |

(Continued)

FOREIGN PATENT DOCUMENTS

DE    102009034931 A1    2/2010
DE    102011102435 A1    11/2012
(Continued)

OTHER PUBLICATIONS

JP 2019023021 english translation (Year: 2019).*

*Primary Examiner* — Anne Marie Antonucci
*Assistant Examiner* — Nicholas Patrick Langhorne
(74) *Attorney, Agent, or Firm* — Ingrassia Fisher & Lorenz, LLP | IF&L

(57) ABSTRACT

Methods and systems for providing driving assistance in a vehicle. In one embodiment, a method includes: determining, by a processor, curvature data associated with a roadway ahead of the vehicle; determining, by the processor, velocity data based on the curvature data, steering data of the vehicle, and set speed data associated with a semi-autonomous control system of the vehicle; and generating, by the processor, control commands to the semi-autonomous control system to control the vehicle to a speed other than a set speed of the set speed data based on the velocity data.

20 Claims, 4 Drawing Sheets

(51) Int. Cl.
*B60W 30/14* (2006.01)
*B60W 30/18* (2012.01)
*B60W 40/072* (2012.01)

(52) U.S. Cl.
CPC .... *B60W 30/18145* (2013.01); *B60W 40/072* (2013.01); *B60W 2420/403* (2013.01); *B60W 2510/20* (2013.01); *B60W 2520/10* (2013.01); *B60W 2520/125* (2013.01); *B60W 2530/20* (2013.01); *B60W 2530/209* (2020.02); *B60W 2552/30* (2020.02); *B60W 2555/20* (2020.02); *B60W 2556/40* (2020.02); *B60W 2720/10* (2013.01)

(58) Field of Classification Search
CPC .. B60W 2556/50; B60W 10/04; B60W 10/10; B60W 10/18; B60W 10/20
See application file for complete search history.

(56) References Cited

U.S. PATENT DOCUMENTS

| | | | |
|---|---|---|---|
| 2022/0219691 A1* | 7/2022 | Maleki | G06F 11/0754 |
| 2022/0250620 A1* | 8/2022 | Hu | B60W 10/06 |
| 2024/0123997 A1* | 4/2024 | Kim | G06V 10/44 |
| 2025/0042399 A1* | 2/2025 | Tomioka | B60W 50/14 |
| 2025/0091577 A1* | 3/2025 | Grelaud | B60W 30/045 |

FOREIGN PATENT DOCUMENTS

| | | |
|---|---|---|
| DE | 102008025174 B4 | 2/2015 |
| DE | 102016107938 A1 | 11/2016 |
| DE | 112015005515 T5 | 12/2017 |
| DE | 102019102944 A1 | 8/2019 |
| DE | 102022102101 A1 | 8/2022 |
| JP | 2019023021 A * | 2/2019 |

* cited by examiner

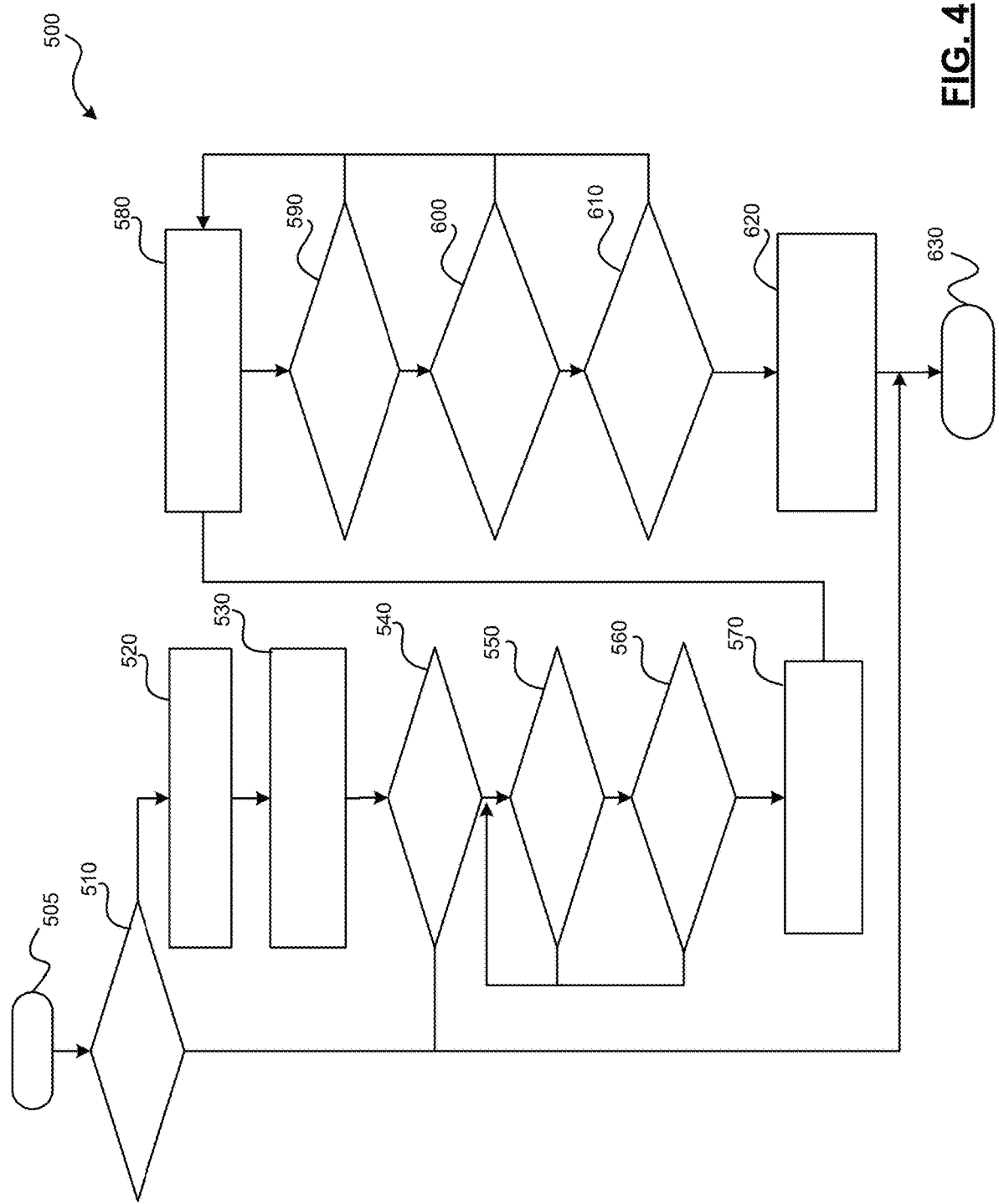

METHODS AND SYSTEMS FOR USING ROAD PREVIEW TO CONTROL VEHICLE VELOCITY DURING CORNERING

INTRODUCTION

The technical field generally relates to systems, methods, and apparatuses for providing velocity control by an autonomous or semi-autonomous driving system based on a road preview.

Some semi-autonomous driving features, such as adaptive cruise control, allow for control of the velocity of the vehicle to follow an intended path or an intended lane based on a set control speed. In some instances, such as on curvy roads, when a vehicle is performing a cornering maneuver, the semi-autonomous driving feature does not adjust the set control speed and the driver is required to step in and assist in the operation of the vehicle. Optimal vehicle cornering requires deceleration of a vehicle when entering the cornering maneuver and acceleration at and after the apex of the cornering maneuver.

Accordingly, it is desirable to provide improved velocity control strategies, methods, and systems for improved semi-autonomous control of the vehicle without driver assistance during such cornering maneuver. Furthermore, other desirable features and characteristics of the present disclosure will become apparent from the subsequent detailed description and the appended claims, taken in conjunction with the accompanying drawings and the foregoing technical field and background.

SUMMARY

Disclosed herein are vehicles with, methods for, and systems for providing driving assistance. In one embodiment, a method includes: determining, by a processor, curvature data associated with a roadway ahead of the vehicle; determining, by the processor, velocity data based on the curvature data, steering data of the vehicle, and set speed data associated with a semi-autonomous control system of the vehicle; and generating, by the processor, control commands to the semi-autonomous control system to control the vehicle to a speed other than a set speed of the set speed data based on the velocity data.

In various embodiments, the determining the curvature data is based on image data received from an image sensor of the vehicle.

In various embodiments, the determining the curvature data is based on at least one of map data and location data received from a global positioning system sensor.

In various embodiments, the determining the curvature data comprises determining a radius of a curve in the roadway ahead of the vehicle, wherein the determining the velocity data is based on the radius.

In various embodiments, the method includes determining a target lateral acceleration based on the radius of the curve in the roadway ahead of the vehicle, and the vehicle speed, and wherein the determining the velocity data is based on the target lateral acceleration.

In various embodiments, the steering data includes a steering angle and a steering rate.

In various embodiments, the method includes when the steering angle is greater than a threshold, and the set speed data is above a threshold, the velocity data is based on a target lateral acceleration.

In various embodiments, the method includes when the steering angle remains greater than the threshold, and the set speed data remains above the threshold, the velocity data is based on an updated target lateral acceleration.

In various embodiments, the method includes when the steering angle is less than the threshold, and the steering rate has changed to opposite of an initial steering rate, and a radius of a curve in the roadway ahead of the vehicle is increasing, the velocity data is based on an acceleration profile and the set speed data.

In various embodiments, the determining the velocity data is based on weather conditions associated with the roadway ahead of the vehicle.

In various embodiments, the determining the velocity data is based on at least one of a tire pressure and a fuel level associated with the vehicle.

In another embodiment, a system includes: a controller including non-transitory computer readable media and configured to, by a processor: determine curvature data associated with a roadway ahead of the vehicle; determine velocity data based on the curvature data, steering data of the vehicle, and set speed data associated with a semi-autonomous control system of the vehicle; and generate control commands to the semi-autonomous control system to control the vehicle to a speed other than a set speed of the set speed data based on the velocity data.

In various embodiments, the controller is configured to determine the curvature data based on image data received from an image sensor of the vehicle.

In various embodiments, wherein the controller is configured to determine the curvature data based on at least one of map data and location data received from a global positioning system sensor.

In various embodiments, the controller is configured to determine the curvature data by determining a radius of a curve in the roadway ahead of the vehicle, and determine the velocity data based on the radius.

In various embodiments, the controller is configured to determine a target lateral acceleration based on the radius of the curve in the roadway ahead of the vehicle, and the vehicle speed, and determine the velocity data based on the target lateral acceleration.

In various embodiments, the steering data includes a steering angle and a steering rate.

In various embodiments, the controller is configured to: when the steering angle is greater than a threshold, and the set speed data is above a threshold, determine the velocity data based on a target lateral acceleration; when the steering angle remains greater than the threshold, and the set speed data remains above the threshold, determine the velocity data based on an updated target lateral acceleration; and when the steering angle is less than the threshold, and the steering rate has changed to opposite of an initial steering rate, and a radius of a curve in the roadway ahead of the vehicle is increasing, determine the velocity data based on an acceleration profile and the set speed data.

In various embodiments, the controller is configured to determine the velocity data based on at least one of a weather condition associated with the roadway ahead of the vehicle, a tire pressure of the vehicle, and a fuel level of the vehicle.

In another embodiment, a vehicle includes: a sensor system configured to sense and environment of the vehicle; a semi-autonomous control system; and a controller for implementing a driver assistance system, the controller configured to: determine, by a processor, curvature data associated with a roadway ahead of the vehicle based on sensor data from the sensor system; determine, by the processor, velocity data based on the curvature data, steering data of the vehicle, and set speed data associated with the semi-autonomous control system; and generate, by the processor, control commands to the semi-autonomous control system to control the vehicle to a speed other than a set speed of the set speed data based on the velocity data.

BRIEF DESCRIPTION OF THE DRAWINGS

The exemplary embodiments will hereinafter be described in conjunction with the following drawing figures, wherein like numerals denote like elements, and wherein:

FIG. 4 is a process flow chart depicting an example process for velocity control, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
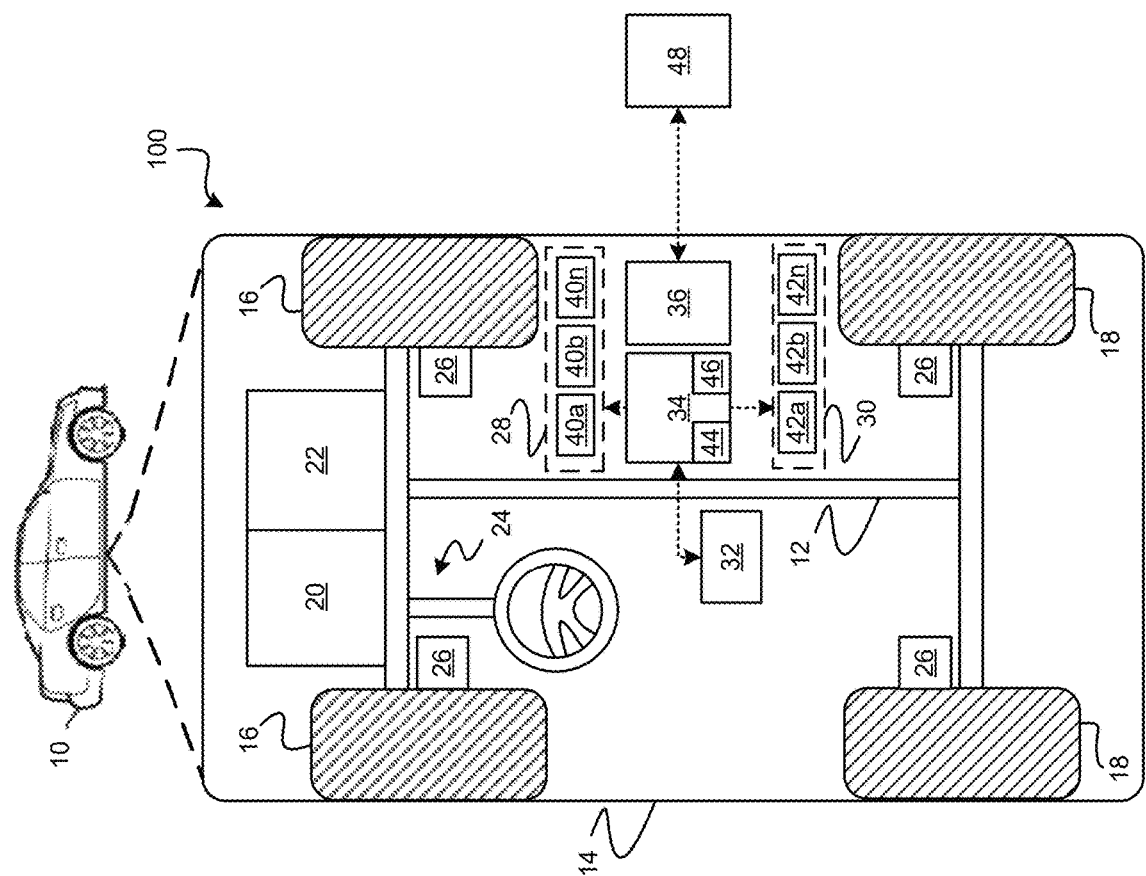
FIG. 1 is a block diagram illustrating a vehicle having a velocity control system, in accordance with various embodiments.

With reference to FIG. 1, a velocity control system shown generally at 100 is associated with a vehicle 10 in accordance with various embodiments. In general, the velocity control system 100 controls the longitudinal velocity of the vehicle based on information obtained from a preview of the road ahead. In various embodiments, the preview of the road is based on mapping information, sensor image preview information, steering angle information, along with vehicle speed.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle and the velocity control system 100 is incorporated into the autonomous or semi-autonomous vehicle 10. The vehicle 10 is, for example, a vehicle that is automatically controlled in some way (i.e., by way of cruise control) to carry passengers or goods from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18 and in some instances includes a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The sensor system 28 further includes one or more sensing devices 40a-40n that sense observable conditions of the vehicle 10 such as, but not limited to, speed sensors, pressure sensors, temperature sensors, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
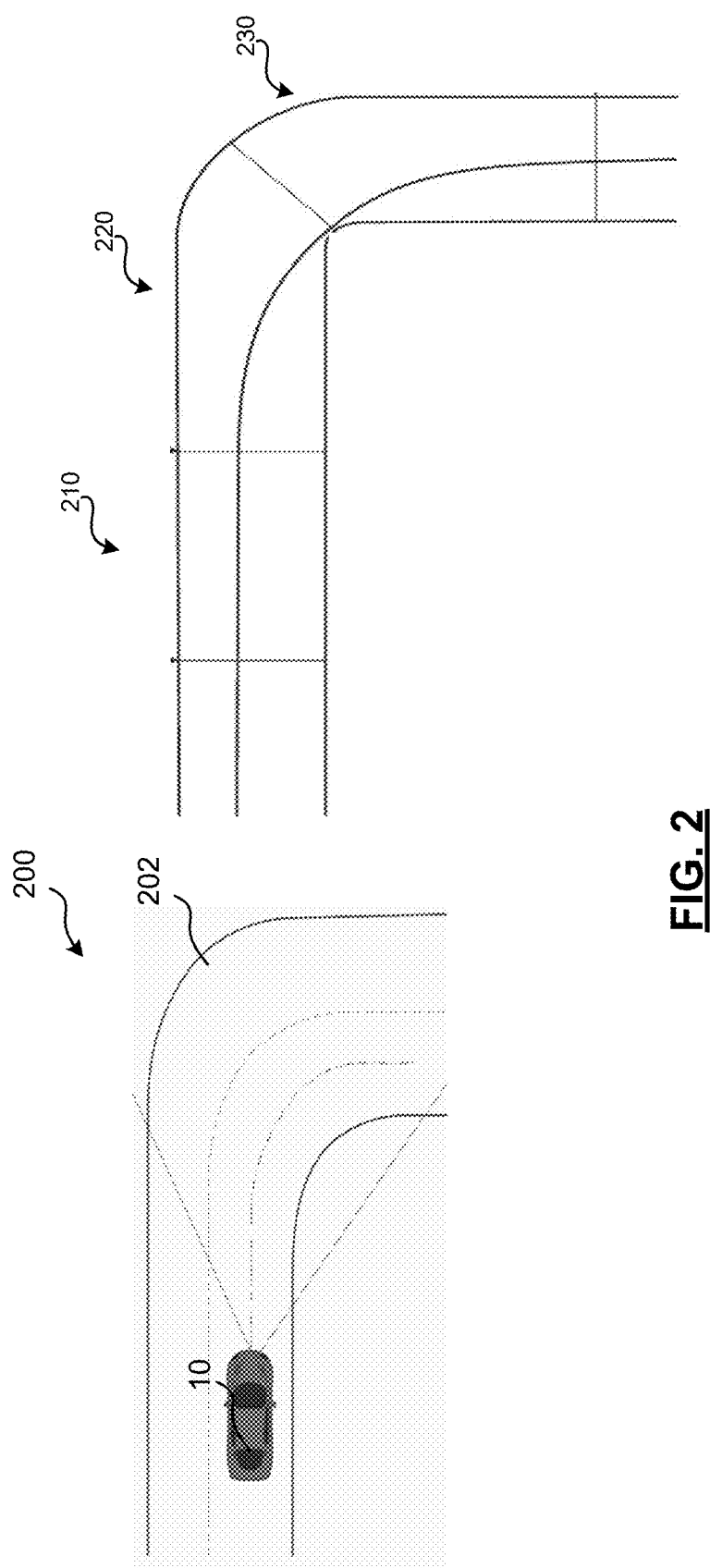
FIG. 2 is an illustration of regions associated with a roadway having a curvature, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, as discussed in detail below, one or more instructions of the controller 34 are embodied in the velocity control system 100 and, when executed by the processor 44, process sensor data and/or other data to determine road preview data, estimate a target lateral acceleration of the vehicle based on the road preview data, and automatically control the vehicle while navigating a curve on the roadway to adjust a cruise control setting or control the braking system to cause the vehicle 10 to decelerate and/or accelerate based on the target lateral acceleration and steering data of the steering system 24.

For example, as shown FIG. 2, when an upcoming roadway 200 that the vehicle 10 is traveling on includes a curve 202 which requires the vehicle 10 to perform a cornering maneuver, the velocity of the vehicle 10 is controlled in a first region 210 based on a predicted lateral acceleration associated with the curve 202. The velocity of the vehicle 10 is further controlled in a second region 220 based on an updated predicted lateral acceleration associated with the curve 202. The velocity of the vehicle 10 is then further controlled in a third region 230 based on an acceleration profile and a control set speed of the semi-autonomous or autonomous driving feature. As will be discussed in the exemplary embodiments herein, the regions are defined based on the steering data and an estimated radius of the curve 202.

In various embodiments, the velocity control system 100 of FIG. 1 may be included within or may interface with a semi-autonomous driving system that implements the semi-autonomous or autonomous driving feature. For example, as shown in more detail with regard to FIG. 2 and with continued reference to FIG. 1, a dataflow diagram illustrates elements of the velocity control system 100 in accordance with various embodiments. As can be appreciated, various embodiments of the velocity control system 100 according to the present disclosure may include any number of modules embedded within the controller 34 which may be combined and/or further partitioned to similarly implement systems and methods described herein. Furthermore, inputs to the velocity control system 100 may be received from the sensor system 28, received from other control modules (not shown) associated with the vehicle 10, and/or determined/modeled by other sub-modules (not shown) within the controller 34 of FIG. 1. In various embodiments, the velocity control system 100 includes a curvature determination module 350, a lateral acceleration determination module 352, a velocity control module 356, and a velocity profile datastore 358.

In various embodiments, the velocity profile datastore 358 stores velocity profiles that define speeds and rates used for longitudinal control of the vehicle 10 in order to accelerate or decelerate the vehicle 10. In various embodiments, any number of velocity profiles can be defined. For example, a velocity profile 400 can be defined as a multi-dimensional lookup table that is based on radius of the curve and/or a lateral acceleration associated therewith, steering data, and/or speed adjust values. As can be appreciated, velocity profiles can be defined for any number of environmental conditions and/or vehicle conditions that may affect the lateral acceleration of the vehicle 10 along the curve, such as, but not limited to, weather conditions, tire pressure, fuel level, etc.

In various embodiments, the velocity profiles provide as output a velocity value for use by the semi-autonomous or autonomous system in controlling the velocity of the vehicle 10. The velocity values may be defined according to the propulsion system, the transmission system, and/or brake system 26 configuration of the vehicle 10 and according to the resulting rates of deceleration/accelerations.

With reference back to FIG. 2, in various embodiments, the curvature determination module 350 receives as input sensor data 360, and GPS location and/or map data 362. The sensor data 360 can include, for example, image data from the camera sensor or other sensing device configured to generate an image of the environment of the vehicle 10. The curvature determination module 350 processes the sensor data 360 and the GPS location and/or map data 362 to determine a radius of the curvature of the road ahead and generates radius data 354 based thereon.

In various embodiments, the curvature determination module 350 determines the curvature based on the type and location of lane markings identified ahead of the vehicle 10 and/or based on a position of the vehicle 10 relative to a map of the of the roadway. As can be appreciated, other methods of determining the radius of the curvature can be implemented, in various embodiments.

In various embodiments, the lateral acceleration determination module 352 receives as input the radius data 364, vehicle velocity data 366, and vehicle sensor data 368. The vehicle sensor data 368 can include data from vehicle sensors (e.g., rain sensor, ambient temperature sensor, tire pressure sensor, fuel level sensor, etc.) indicating environmental conditions or other conditions associated with the upcoming roadway or the vehicle 10. The lateral acceleration determination module 352 determines a lateral acceleration of the vehicle 10 for the predicted radius of the upcoming curvature and given the associated conditions and generates target lateral acceleration data 370 based thereon.

For example, the lateral acceleration determination module 352 determines the target lateral acceleration based on the relationship:

$$a_y = \frac{v^2}{r},$$

where r represents the predicted radius of the curvature of the upcoming roadway as provided by the radius data 364, and $v^2$ represents the longitudinal velocity (or speed) of the vehicle 10 as provided by the vehicle velocity data 366. In various embodiments, the determined lateral acceleration can be compensated by applying a compensation value that is determined based on the vehicle sensor data 368. For example, when the sensor data 368 indicates that rain is sensed, the lateral acceleration is adjusted down to account for a lower coefficient of friction of the roadway. In another example, when the sensor data 368 indicates that the tire pressure is lower than a recommended value, the lateral acceleration is increased due to, for example, vehicle roll. In still another example, when the sensor data 368 indicates that the fuel level is high, the lateral acceleration is increased due to, for example, slosh that occurs with additional fuel.

The velocity control module 356 receives as input the target lateral acceleration data 370, set control speed data 372, and steering data 374. In various embodiments, the set control speed data 372 includes a set control speed identified by the semi-autonomous or autonomous control system (i.e., the cruise control feature). In various embodiments, the steering data 374 includes a steering angle and a steering rate of the steering system 24. Based on the inputs, the velocity control module 356 generates a velocity control command 376 to be used by the semi-autonomous control system to adjust the set control speed of the semi-autonomous feature thereby controlling the velocity of the vehicle 10.

For example, when the steering angle is greater than a threshold (e.g., three degrees or some other value), and the semi-autonomous control is engaged at a set control speed of greater than a threshold (region 210 of FIG. 2), the velocity control module 356 generates commands to be used by the semi-autonomous control system to adjust the set control speed such that the target lateral acceleration can be achieved by, for example, obtaining the velocity data 378 from the velocity profile datastore 358 based on the radius data 364, the target lateral acceleration data 370, and/or the steering data 374.

In another example, while the steering angle remains greater than the threshold, and the semi-autonomous control remains engaged at a set control speed of greater than a threshold (region 220 of FIG. 2), the velocity control module 356 generates commands to be used by the semi-autonomous control system to adjust the set control speed such that an updated target lateral acceleration can be achieved by, for example, obtaining the velocity data 378 from the velocity profile datastore 358 based on the radius data 364, the target lateral acceleration data 370, and/or the steering data 374.

In another example, once the steering angle is less than the threshold, and the steering rate has changed to opposite of the initial steering rate, and the radius is increasing (region 230 of FIG. 2), the velocity control module 356 generates a velocity control command 376 to be used by the semi-autonomous control system to adjust the set control speed by a defined increment or by a defined acceleration profile.

Figure 3:
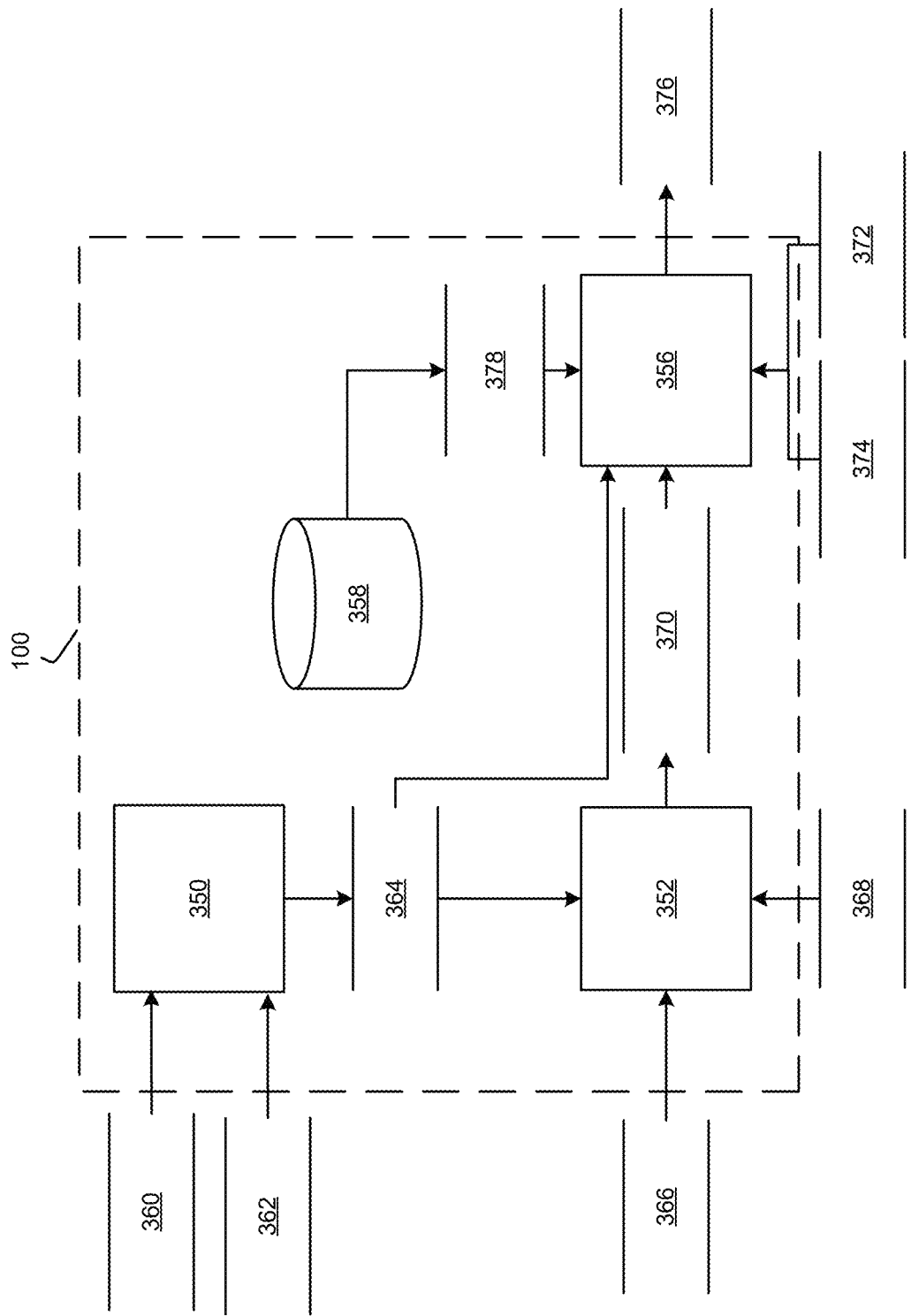
FIG. 3 is a dataflow diagram illustrating features of the velocity control system of the vehicle, in accordance with various embodiments.

Referring now to FIG. 4, and with continued reference to FIGS. 1-3, a flowchart illustrates a process 500 that can be performed by the velocity control system 100 of FIGS. 1-4 in accordance with the present disclosure. As can be appreciated in light of the disclosure, the order of operation within the process 500 is not limited to the sequential execution as illustrated in FIG. 4 but may be performed in one or more varying orders as applicable and in accordance with the present disclosure. In various embodiments, the process 500 can be scheduled to run based on one or more predetermined events, and/or can run continuously during operation of the vehicle 10.

In one example, the process 500 may begin at 505. It is determined whether speed control is active at 510, for example, by enablement of an autonomous or semi-autonomous feature such as cruise control. If speed control is not active at 510, the process 500 may continue to monitor for when speed control is active at 510 or may end at 630.

When it is determined that speed control is active at 510, the curvature of the upcoming roadway is monitored at 520. A target lateral acceleration associated with a radius of the upcoming curvature and other vehicle conditions is determined at 530, for example, as discussed above. When the radius is above a threshold at 540 (e.g., the upcoming roadway is fairly straight), the process 500 may end at 630.

When the radius is below a threshold at 540, the steering angle and set control speed are optionally monitored at 550 and 560. For example, when the steering angle is greater than a threshold at 550, and the set control speed is greater than a threshold at 560, commands are generated to control the longitudinal velocity of the vehicle 10 to achieve the computed target lateral acceleration at or below the target lateral acceleration at 570. Otherwise, when the steering angle is less than the threshold at 550, or the set control speed is less than the threshold at 560, the process 500 continues with monitoring the steering angle and the set control speed at 550 and 560.

At 580, the target lateral acceleration is determined based on the upcoming radius and the steering data. Once the steering angle becomes less than the threshold at 590, and the steering rate is changed to the opposite direction at 600, the radius is monitored at 610.

If the radius is determined not to be increasing at 610, the process 500 continues with updating the target lateral acceleration and controlling the vehicle 10 based thereon at 580. Once the radius is determined to be increasing at 610, commands are generated to control the velocity of the vehicle 10 to increase to the set control speed by a defined increment or by a speed acceleration profile at 620. Thereafter, the process 500 may end at 630.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for providing driving assistance in a vehicle, comprising:
   receiving, by a processor, image data from an image sensor of the vehicle;
   receiving, by the processor, a fuel level from a fuel level sensor of the vehicle;
   determining, by the processor, curvature data associated with first, second, and third regions of a curve on a roadway ahead of the vehicle based on the image data;
   determining, by the processor, velocity data based on the curvature data, steering data of the vehicle, and set speed data associated with a semi-autonomous control system of the vehicle, the steering data including a steering angle and a steering rate, wherein:
      when the steering angle is greater than a threshold in the first region of the curve, and the set speed data is above a threshold, determine the velocity data based in part on a target lateral acceleration;
      when the steering angle remains greater than the threshold in the second region of the curve, and the set speed data remains above the threshold, determine the velocity data based in part on an updated target lateral acceleration;
      when the steering angle drops below the threshold in the third region of the curve and the steering rate has changed to opposite of an initial steering rate, determine the velocity data based in part on an acceleration profile and the set speed data, wherein the opposite of the initial steering rate is a steering rate that has a magnitude that has changed from a negative value to a positive value;
      the determining the velocity data is based in part on weather conditions associated with the roadway ahead of the vehicle;
      the determining the velocity data is based in part on slosh associated with the fuel level of the vehicle; and
   generating, by the processor, control commands to the semi-autonomous control system to control the vehicle to a speed other than a set speed of the set speed data based on the velocity data.

2. The method of claim 1, wherein the determining the curvature data is based on at least one of map data and location data received from a global positioning system sensor.

3. The method of claim 1, wherein the determining the curvature data comprises determining a radius of the curve in the roadway ahead of the vehicle, wherein the determining the velocity data is based on the radius.

4. The method of claim 3, further comprising determining the target lateral acceleration based on the radius of the curve in the roadway ahead of the vehicle, and the vehicle speed, and wherein the determining the velocity data is based on the target lateral acceleration.

5. The method of claim 1, wherein the determining the velocity data is based on a tire pressure associated with the vehicle.

6. The method of claim 1, further comprising determining the curvature data based on a type and location of lane markings on the roadway identified ahead of the vehicle.

7. A system in a vehicle for providing driving assistance, comprising:
   a controller including non-transitory computer readable media and configured to, by a processor:
   receive image data from an image sensor of the vehicle;
   receive a fuel level from a fuel level sensor of the vehicle;
   determine curvature data associated with first, second, and third regions of a curve on a roadway ahead of the vehicle based on the image data;
   determine velocity data based on the curvature data, steering data of the vehicle, and set speed data associated with a semi-autonomous control system of the vehicle, the steering data including a steering angle and a steering rate, wherein:
      when the steering angle is greater than a threshold in the first region of the curve, and the set speed data is above a threshold, determine the velocity data based in part on a target lateral acceleration;
      when the steering angle remains greater than the threshold in the second region of the curve, and the set speed data remains above the threshold, determine the velocity data based in part on an updated target lateral acceleration;
      when the steering angle drops below the threshold in the third region of the curve and the steering rate has changed to opposite of an initial steering rate, determine the velocity data based in part on an acceleration profile and the set speed data, wherein the opposite of the initial steering rate is a steering rate having a magnitude that has changed from a negative value to a positive value;
      the determining the velocity data is based in part on weather conditions associated with the roadway ahead of the vehicle;
      the determining the velocity data is based in part on slosh associated with the fuel level of the vehicle; and generate control commands to the semi-autonomous control system to control the vehicle to a speed other than a set speed of the set speed data based on the velocity data.

8. The system of claim 7, wherein the controller is configured to determine the curvature data based on at least one of map data and location data received from a global positioning system sensor.

9. The system of claim 7, wherein the controller is configured to determine the curvature data by determining a radius of the curve in the roadway ahead of the vehicle, and determine the velocity data based on the radius.

10. The system of claim 9, wherein the controller is configured to determine the target lateral acceleration based on the radius of the curve in the roadway ahead of the vehicle, and the vehicle speed, and determine the velocity data based on the target lateral acceleration.

11. The system of claim 7, wherein the controller is configured to determine the velocity data based on a tire pressure of the vehicle.

12. The system of claim 7, wherein the controller is configured to determine the curvature data based on a type and location of lane markings identified on the roadway ahead of the vehicle.

13. A vehicle comprising:
a sensor system configured to sense an environment of the vehicle;
a fuel level sensor;
a semi-autonomous control system; and
a controller for implementing a driver assistance system, the controller configured to:
receive, by a processor, sensor data from the sensor system;
receive, by the processor, a fuel level from the fuel level sensor;
determine, by the processor, curvature data associated with first, second, and third regions of a curve on a roadway ahead of the vehicle based on the sensor data from the sensor system;
determine, by the processor, velocity data based on the curvature data, steering data of the vehicle, and set speed data associated with the semi-autonomous control system, wherein:
when the steering angle is greater than a threshold in the first region of the curve, and the set speed data is above a threshold, determine the velocity data based in part on a target lateral acceleration;
when the steering angle remains greater than the threshold in the second region of the curve, and the set speed data remains above the threshold, determine the velocity data based in part on an updated target lateral acceleration;
when the steering angle drops below the threshold in the third region of the curve and the steering rate has changed to opposite of an initial steering rate, determine the velocity data based in part on an acceleration profile and the set speed data, wherein the opposite of the initial steering rate is a steering rate that has a magnitude that has changed from a negative value to a positive value;
the determining the velocity data is based in part on weather conditions associated with the roadway ahead of the vehicle;
the determining the velocity data is based in part on slosh associated with the fuel level of the vehicle; and
generate, by the processor, control commands to the semi-autonomous control system to control the vehicle to a speed other than a set speed of the set speed data based on the velocity data.

14. The vehicle of claim 13, wherein the controller is configured to determine the curvature data is based on map data.

15. The vehicle of claim 13, wherein the controller is configured to determine the curvature data is based on location data received from a global positioning system sensor.

16. The vehicle of claim 13, wherein the controller is configured to determine the curvature data by determining a radius of the curve in the roadway ahead of the vehicle, wherein the determining the velocity data is based on the radius.

17. The vehicle of claim 16, wherein controller is configured to determine the target lateral acceleration based on the radius of the curve in the roadway ahead of the vehicle, and the vehicle speed, and wherein the determining the velocity data is based on the target lateral acceleration.

18. The vehicle of claim 13, wherein the controller is configured to determine the velocity data is based on a tire pressure associated with the vehicle.

19. The vehicle of claim 13, wherein the controller is configured to determine the curvature data based on a type and location of lane markings identified on the roadway ahead of the vehicle.

20. The vehicle of claim 13, wherein the sensor system comprises an image sensor.

* * * * *